United States Patent
Thakur et al.

(10) Patent No.: US 7,739,680 B1
(45) Date of Patent: Jun. 15, 2010

(54) APPLICATION SERVER PRODUCTION SOFTWARE UPGRADING WITH HIGH AVAILABILITY STAGING SOFTWARE

(75) Inventors: Brajendra Singh Thakur, Overland Park, KS (US); Nasir Mahmood Mirza, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1360 days.

(21) Appl. No.: 11/186,229

(22) Filed: Jul. 21, 2005

(51) Int. Cl.
*G06F 9/445* (2006.01)
*G06F 15/16* (2006.01)

(52) U.S. Cl. ............... 717/172; 717/169; 717/170; 717/171; 717/173; 709/248

(58) Field of Classification Search ......... 717/168–178; 709/203, 217–218, 223
See application file for complete search history.

(56) References Cited

U.S. PATENT DOCUMENTS

| | | | | |
|---|---|---|---|---|
| 5,862,325 | A * | 1/1999 | Reed et al. | 709/201 |
| 6,026,371 | A * | 2/2000 | Beck et al. | 705/14 |
| 6,615,253 | B1 * | 9/2003 | Bowman-Amuah | 709/219 |
| 6,668,253 | B1 * | 12/2003 | Thompson et al. | 707/10 |
| 7,080,371 | B1 * | 7/2006 | Arnaiz et al. | 717/170 |
| 7,177,886 | B2 * | 2/2007 | Pruet, III | 707/204 |
| 7,359,963 | B1 * | 4/2008 | Huang et al. | 709/223 |
| 7,370,064 | B2 * | 5/2008 | Yousefi'zadeh | 707/200 |
| 7,475,281 | B2 * | 1/2009 | Varghese | 714/6 |
| 7,478,382 | B2 * | 1/2009 | Menahemi et al. | 717/168 |
| 2002/0169889 | A1 * | 11/2002 | Yang et al. | 709/244 |
| 2002/0184165 | A1 * | 12/2002 | Deboer et al. | 706/1 |
| 2003/0078959 | A1 * | 4/2003 | Yeung et al. | 709/201 |
| 2003/0149721 | A1 * | 8/2003 | Alfonso-Nogueiro et al. | 709/203 |
| 2003/0192031 | A1 * | 10/2003 | Srinivasan et al. | 717/120 |
| 2003/0225851 | A1 * | 12/2003 | Fanshier et al. | 709/208 |
| 2004/0078490 | A1 * | 4/2004 | Anderson et al. | 709/245 |
| 2005/0075436 | A1 * | 4/2005 | McHugh et al. | 524/366 |
| 2005/0080804 | A1 * | 4/2005 | Bradshaw et al. | 707/102 |
| 2005/0210526 | A1 * | 9/2005 | Levy et al. | 725/113 |
| 2005/0240652 | A1 * | 10/2005 | Crick | 709/203 |
| 2006/0069753 | A1 * | 3/2006 | Hu et al. | 709/220 |
| 2006/0242327 | A1 * | 10/2006 | Knight et al. | 709/248 |
| 2008/0295092 | A1 * | 11/2008 | Tan et al. | 717/178 |

* cited by examiner

*Primary Examiner*—Tuan Q Dam
*Assistant Examiner*—Isaac T Tecklu

(57) ABSTRACT

An application system comprising an application server configured to run first version software for an application and second version software for the application. The application system further comprises a staging database server configured to initially interface with the second version software to populate a staging database system with second data for the application generated by the second version software. The application system further comprises a production database server configured to initially interface with the first version software to populate a production database system with first data for the application generated by the first version software, synchronize the first data with the second data to replicate the second data to the production database system, cease interfacing with the first version software and begin to interface with the second version software to populate the production database system with the second data generated by the second version software.

14 Claims, 11 Drawing Sheets

APPLICATION SERVER PRODUCTION SOFTWARE UPGRADING WITH HIGH AVAILABILITY STAGING SOFTWARE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to software update processes, and in particular, to high availability upgrading with staging software running on production application servers.

2. Description of the Prior Art

Implementing new hardware and software applications or upgrading existing configurations typically requires a staging system and a production system. For example, FIG. 1 illustrates application system 100 in the prior art. Application system 100 includes production system 101 and staging system 102. Production system 101 includes production application server 110, version one software 111, and a database system 112. Staging system 102 includes staging application server 120, version two software 121, and database system 122.

At times, it is required to update version one software 111 with a new version, such as version two software 121. FIG. 2 illustrates the operation of application system 100 in an example of the prior art whereby version one software 111 is updated with version two software 121.

To begin, version two software 121 is installed on staging application server 120 (Step 210). Next, version two software 121 is tested to ensure its operations (Step 220. The tests are analyzed to determine if version two software 121 is successful (Step 230). If not, version two software 121 can be modified (Step 240), and the process repeated until version two software 121 is considered successful. If the tests are successful, production application server 110 is taken out of operations for upgrading (Step 250). Version two software 121 is then installed on production application server 110. Lastly, Production application server 110 is put back in service running version two software 121.

Problematically, prior art upgrade processes require taking live production application servers out of service. This can be detrimental of overall operations. For instance, customers desiring to access a e-commerce application server will be prohibited from making any purchases. Further problematically, the only way to know if version two software 121 will actually run correctly and successfully on production application server 110 is by taking the chance of running the upgraded system live.

SUMMARY OF THE INVENTION

An embodiment of the invention helps solve the above problems and other problems by providing systems and methods for efficiently and effectively upgrading a production system from a staging system without taking down the production system. In an embodiment of the invention, an application system comprises an application server configured to run first version software for an application and second version software for the application. The application system further comprises a staging database server configured to initially interface with the second version software to populate a staging database system with second data for the application generated by the second version software. The application system further comprises a production database server configured to initially interface with the first version software to populate a production database system with first data for the application generated by the first version software, synchronize the first data with the second data to replicate the second data to the production database system, cease interfacing with the first version software and begin to interface with the second version software to populate the production database system with the second data generated by the second version software.

In an embodiment of the invention, the production database server is further configured to record the changes made to the first data to synchronize the first data with the second data.

In an embodiment of the invention, the production database server is further configured to reverse the changes made to the first data, cease interfacing with the second version software, and switch back to interfacing with the first version software.

In an embodiment of the invention, the staging database server is further configured to cease interfacing with the version two software and begin interfacing with the first version software to populate staging database system with the first data for the application generated by the first version software.

In an embodiment of the invention, the second version software is an upgrade of the first version software.

In an embodiment of the invention, the production database server interfacing with the first version software comprises a live application system and wherein the staging database server interfacing with the second version software comprises a staging application system.

In an embodiment of the invention, the live application system is live and the staging application system is not live.

In an embodiment of the invention, the production database server interfacing with the second version software comprises a live application system.

In another embodiment of the invention, a method of operating an application system comprises, in an application server, running first version software for an application and second version software for the application, in a staging database server, initially interfacing with the second version software to populate a staging database system with second data for the application generated by the second version software, in a production database server, initially interfacing with the first version software to populate a production database system with first data for the application generated by the first version software, synchronizing the first data with the second data to replicate the second data to the production database system, ceasing interfacing with the first version software and beginning interfacing with the second version software to populate the production database system with the second data generated by the second version software.

An embodiment of the invention further comprises recording the changes made to the first data to synchronize the first data with the second data.

An embodiment of the invention further comprises, in the production database server, reversing the changes made to the first data, ceasing interfacing with the second version software, and switching back to interfacing with the first version software.

An embodiment of the invention further comprises, in the staging database server, ceasing interfacing with the version two software and beginning interfacing with the first version software to populate staging database system with the first data for the application generated by the first version software.

An embodiment of the invention the second version software is an upgrade of the first version software.

An embodiment of the invention the production database server interfaced with the first version software comprises a live application system and wherein the staging database server interfaced with the second version software comprises a staging application system.

An embodiment of the invention the live application system is live and the staging application system is not live.

An embodiment of the invention the production database server interfacing with the second version software comprises a live application system.

BRIEF DESCRIPTION OF THE DRAWINGS

The same reference number represents the same element on all drawings.

DETAILED DESCRIPTION OF THE PREFERRED EMBODIMENT

FIGS. 3-11 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation—FIGS. 3-9

Figure 1:
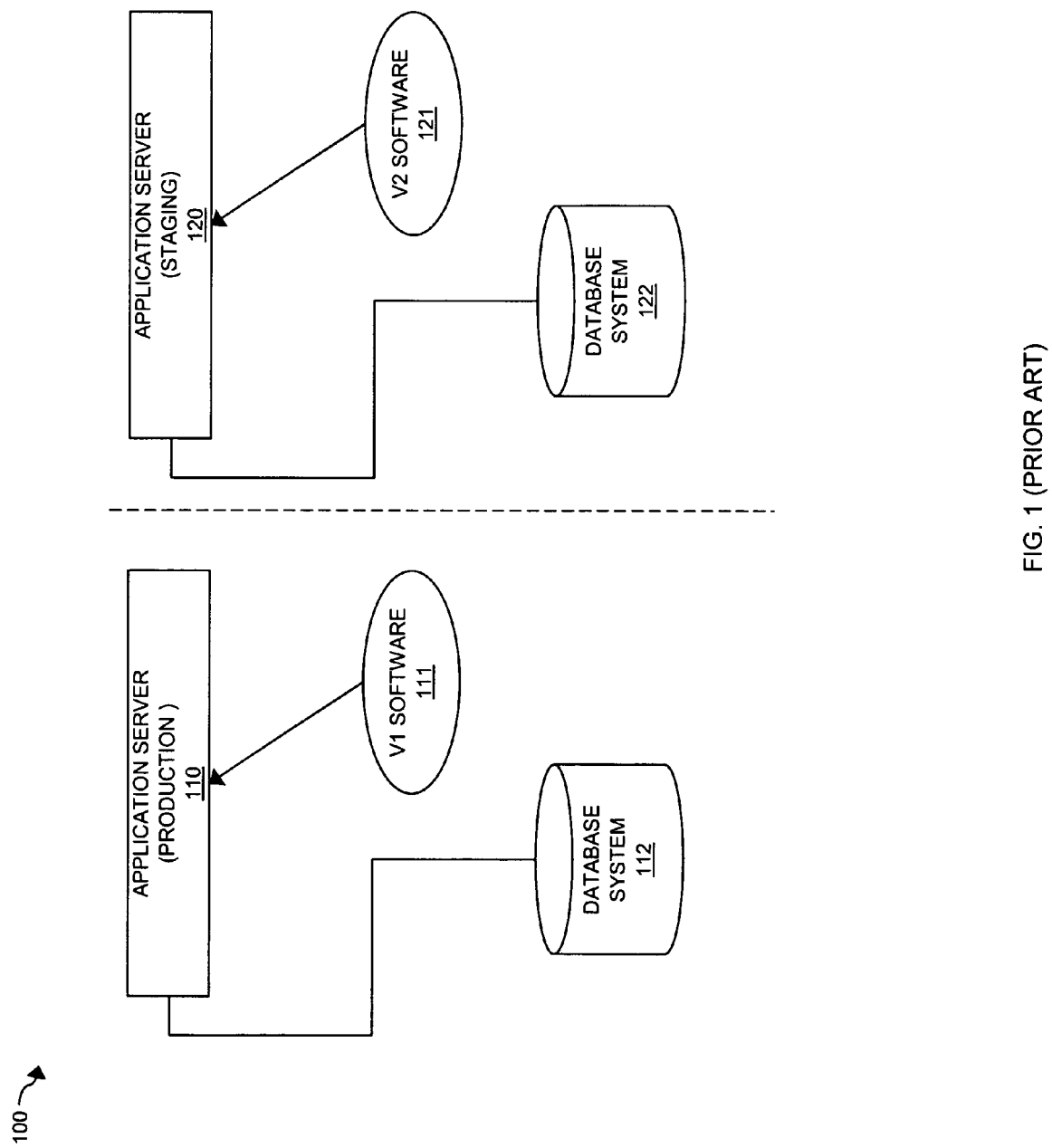
FIG. 1 illustrates an application system in an example of the prior art.
Figure 2:
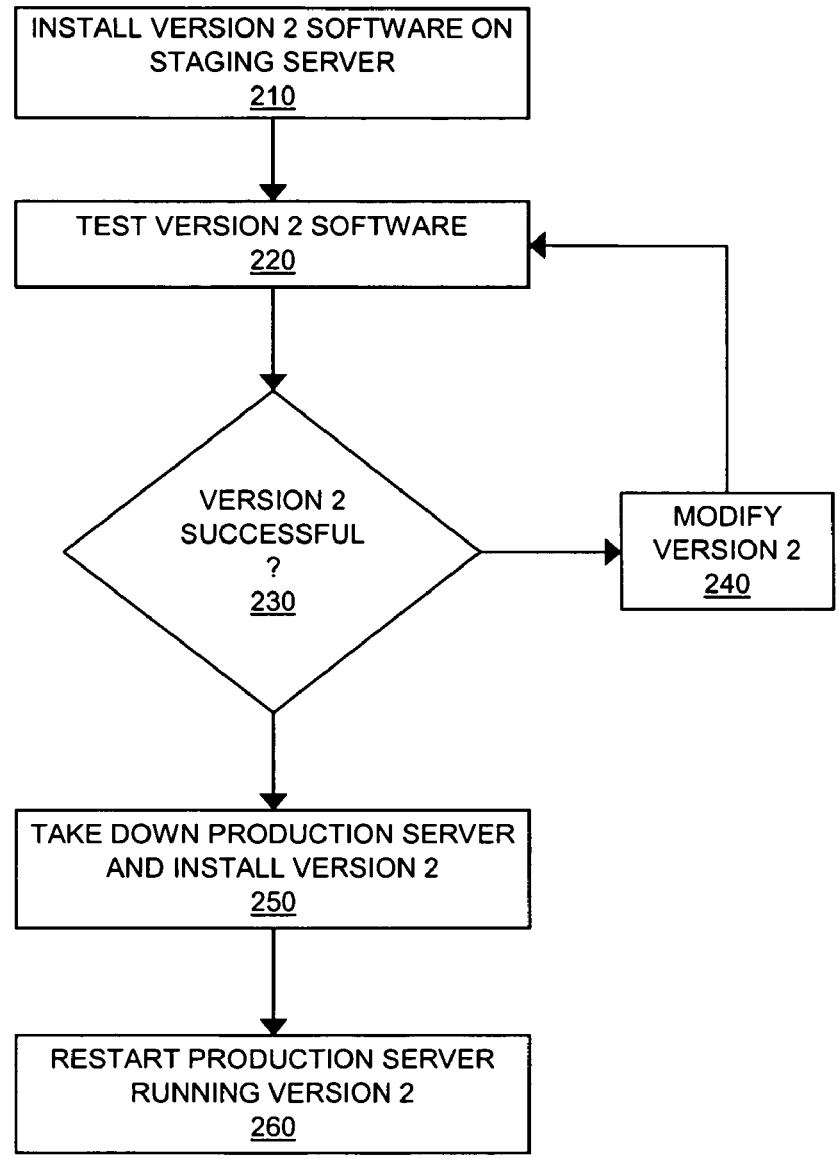
FIG. 2 illustrates the operation of an application system in an example of the prior art.
Figure 3:
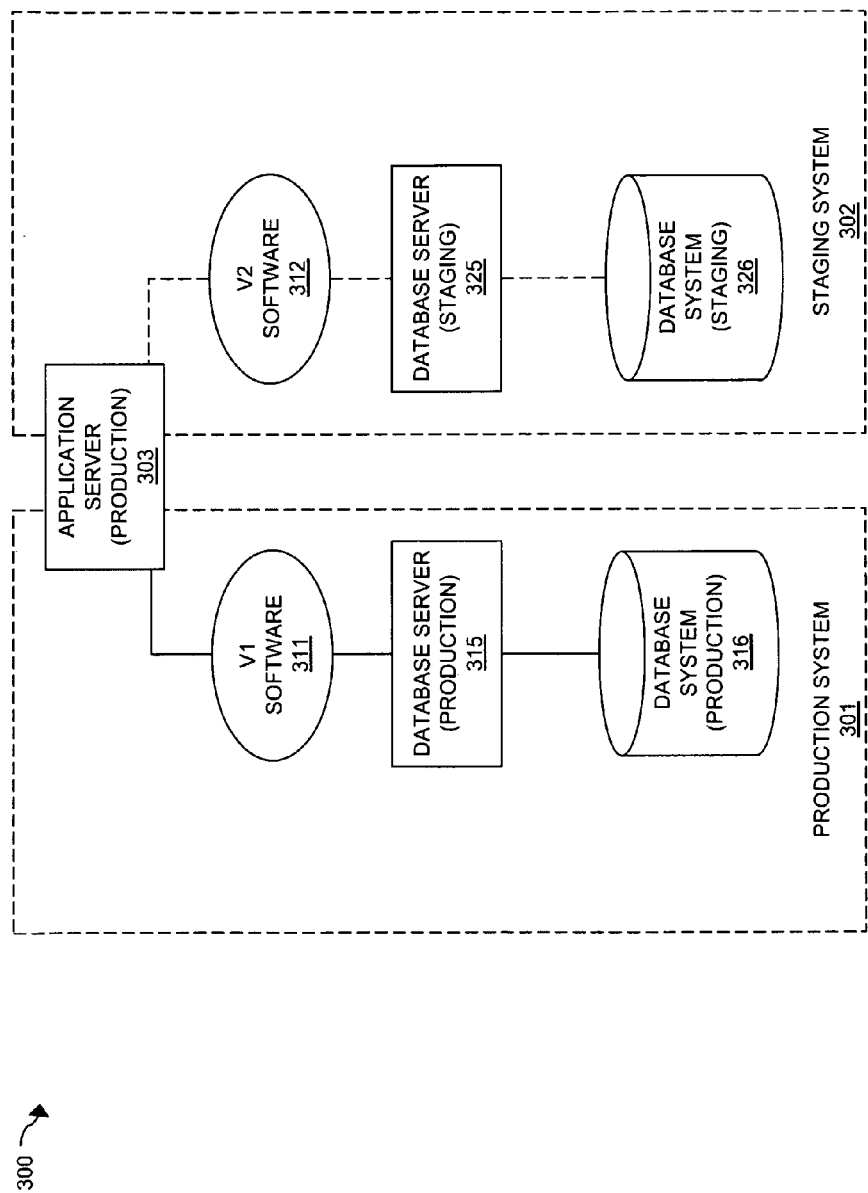
FIG. 3 illustrates an application system in an embodiment of the invention.

FIG. 3 illustrates application system 300 in an embodiment of the invention. Application system 300 includes production system 301 and staging system 302. Production application server 303 bridges production system 301 and staging system 302. Production system 301 further includes version one software 311, production database server 315, and production database system 316. Staging system 302 further includes version two software 312, staging database server 325, and staging database system 326.

In operation, production system 301 could be used for live application operations. For example, first version software 311 could be software used for a network application, such as a call record application in a telecommunications network. Production application server 303 could run first version software 311 for call record operations in the telecommunications network. First version software 311 could receive, transmit, and generate data for the overall billing application. Production database server 315 could interface with first version software 311 to store the generated data in production database system.

Further in operation, staging system 302 could be used for developing applications for later use in live application operations. For example, version two software 312 could be an updated version of first version one software 311. Staging system 302 can be tested to determine if version two software 312 is ready for use in production system 301.

Production application server 303 could be any application server capable of running at least two software versions simultaneously for one application. Production application server 303 could be partitioned in a conventional manner to allow version one software 311 to coincide operatively with version two software 312.

In a telecommunications billing application example, version one software 311 could be software used as a part of or the entire billing application to receive and process call records. Version two software 312 could be an upgraded version of version one software 311 and could also be used to receive and process call records. Application server 303 could receive an application data stream consisting of call records. Version one software 311 could receive a copy of the application stream, as could version two software 312. Version one software 311 could process the call records in accordance with the software instructions comprising version one software 311. Production database server 315 could interface with version one software 311 to store the data generated as a result of processing the call records. Staging database server 325 could interface with version two software 312 to store the data generated as a result of processing the call records.

Importantly, production system 301 could be a live system. This means that production system 301 can not be taken down without detrimentally effecting the operations of any applications running on production system 301. In addition, production system 301 cannot be changed mid-stream during operation. For instance, version one software 311 cannot be changed during real-time live operations. The dashed lines in FIG. 3 are intended to represent staging operations, whereas the solid lines are intended to represent live operations.

However, staging system 302 can be taken down and modified. Thus, even though version two software 312 receives and processes a live data stream, staging system 302 can be taken down without cause for concern. This allows modifications to be made to version two software 312. A conventional interface to production application server 303 could provide for disabling or shutdown of staging system 302 without affecting production system 301. In such a case, version one software 311 will continue to run as normal during times when version two software 312 is off-line.

Figure 4:
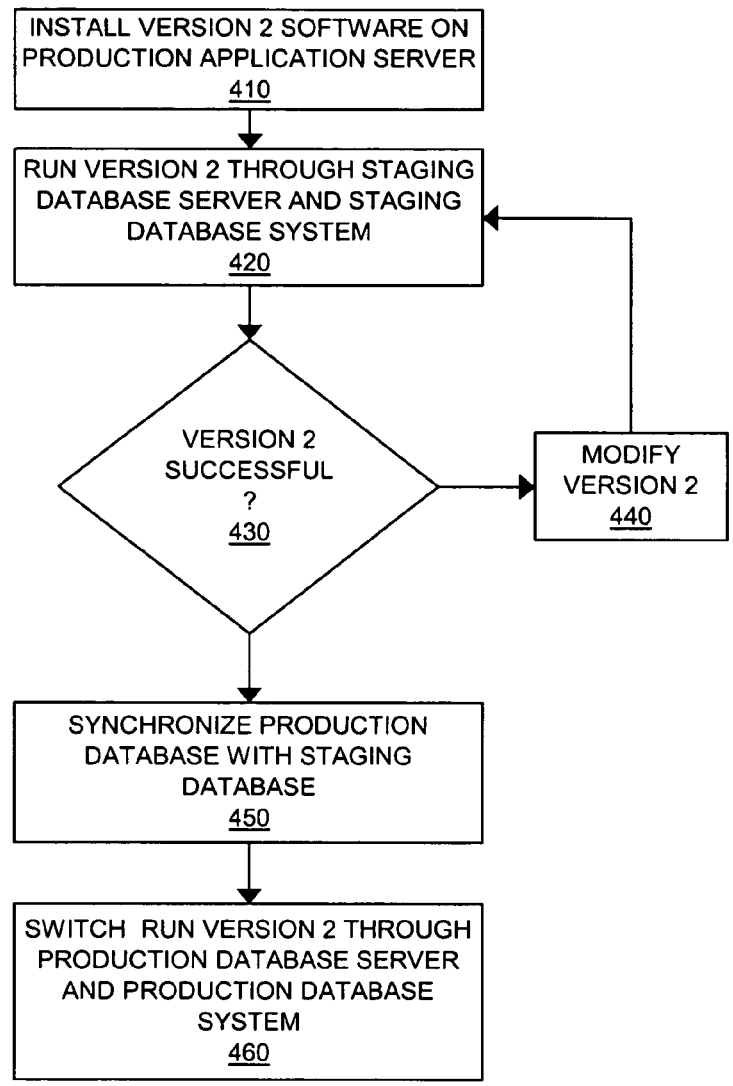
FIG. 4 illustrates the operation of an application system in an embodiment of the invention.

FIG. 4 illustrates the operation of application system 300 in an embodiment of the invention. To begin, version two software 312 is installed on production application server 304 (Step 410). While running, version two software 312 is logically linked to staging database server 325 and staging database system 326 (Step 420). Any data generated by version two software 312 during staging operations will be stored in staging database system 326. Likewise, version two software 312 will access staging database system 326 to retrieve data.

A determination is then made based on the performance of version two software whether or not the version is successful (Step 430). Such a determination could be made automatically by a software audit program, as well as manually by operators testing the software. If version two software 312 is not up to par, modifications can be made (Step 440). The process then continues until a satisfactory level is reached. If version two software 312 is acceptable, the process can begin to upgrade version one software 311 with version two software 312.

Figure 5:
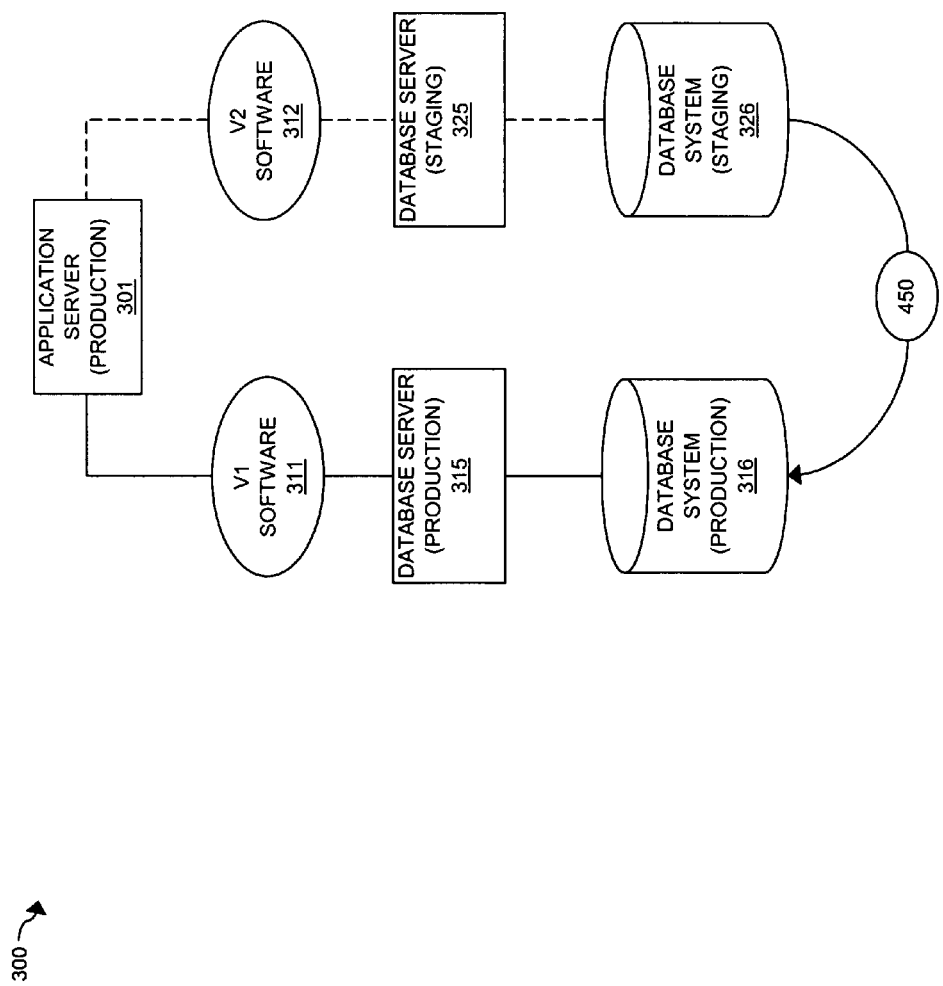
FIG. 5 illustrates an application system in an embodiment of the invention.

Once the upgrade stage has been reached, production database system 316 is synchronized with staging database system 326 (Step 450). FIG. 5 illustrates the synchronization process of Step 450 with respect to application system 300. Up until this point, version two software 312 has been processing actual application data and populating staging database system 326 with the data. However, there could be gaps or inaccuracies in the data depending upon how long version two software 312 was down for modifications. It is therefore necessary to synchronize staging database system 326 with production database system 316.

The synchronization process can include changing the data structures in production database system 316 to match those in staging database system 326. For example version two software 312 may require additional fields in a table as compared to version one software 311. In addition to synching the data structures, the actual data must be synchronized. This could require replicating all the data from staging database system 326 to production database system 316. Alternatively, this could require populating the new data structures with the data initially stored in production database system 316. Production database server 316, staging database server 325, or production application server 304 could perform the synchronization and replication processes. In an alternative, a separate computing system could be used to perform the replication process. During the synchronization process, the changes made to production database system 316 can be recorded. The record could be kept in a log or a file, as well as in other manners.

Once the synchronization process is complete, production system 301 is prepared to switch its application operations to include version two software 312 and discard or cease using version one software 311 (Step 460). Production database server 315 ceases interfacing with version one software 311 and begins interfacing with version two software 312. This could be accomplished in a conventional manner, such as changing a network address in a configuration file. Other well known ways to configure application interfaces could also be used. Nearly simultaneously, staging database server 325 ceases to interface with version two software 312.

The switch to version two software 312 from version one software 311 could occur in response to a manual prompt. Alternatively, the switch could occur in response to a network even. Production application server 304 could control the switching operations. Alternatively, a separate computer system could control the switching operations through application interfaces well known in the art.

Figure 6:
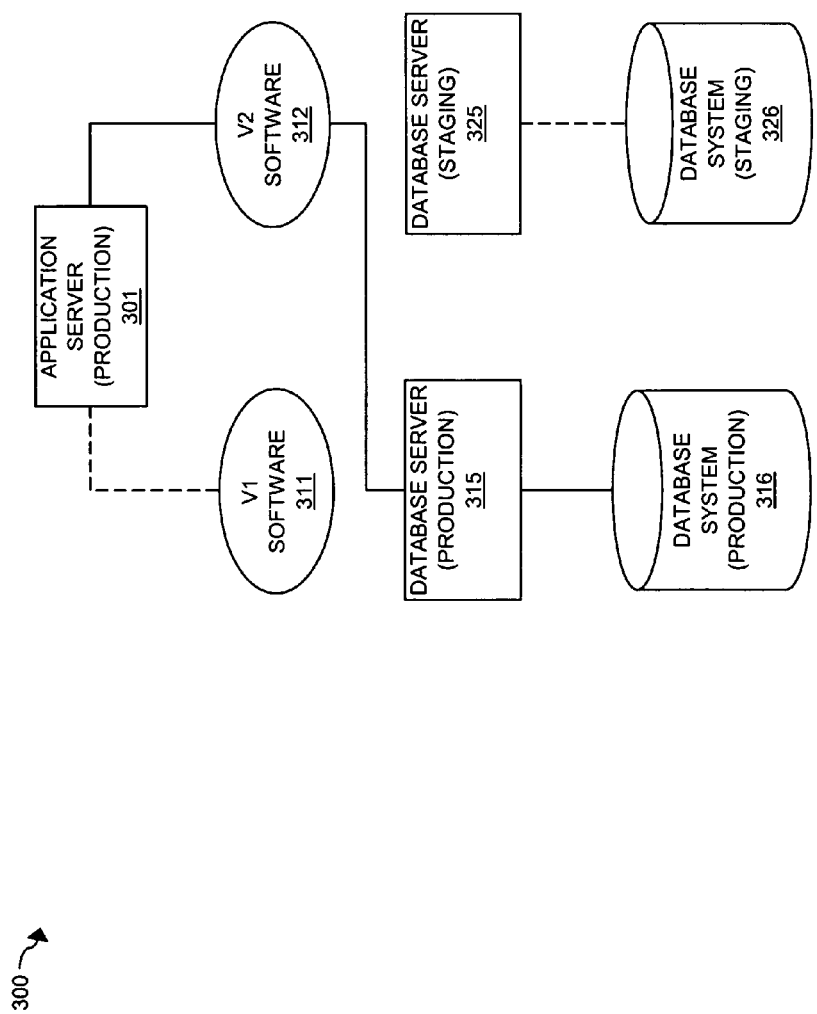
FIG. 6 illustrates an application system in an embodiment of the invention.

FIG. 6 illustrates the resulting topology of application system 300 after the upgrade process has been executed. As illustrated, production database server 315 now interfaces with version two software 312. Data generated by version two software 312 is now stored in production database system 316. Likewise, version two software 312 now retrieves data from production database system 316. At the same time, version one software 311 has been halted.

Figure 7:
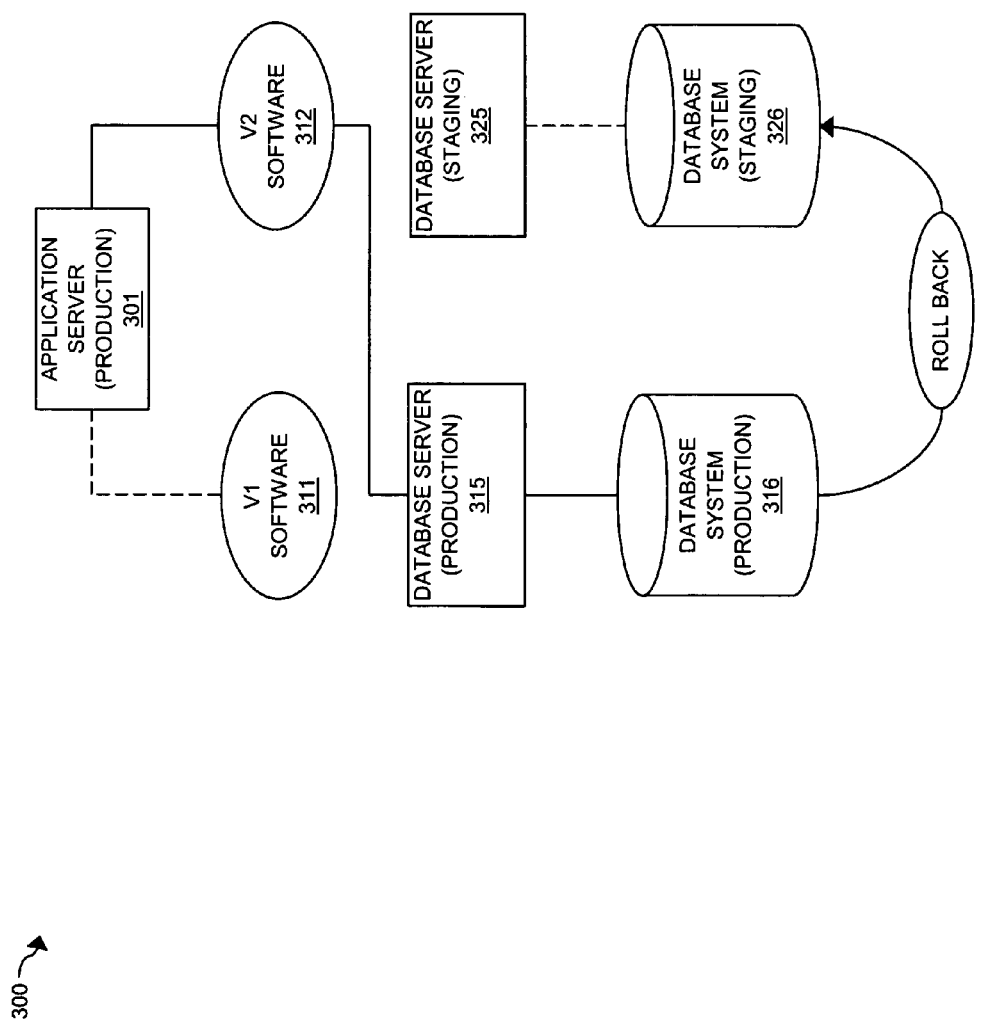
FIG. 7 illustrates an application system in an embodiment of the invention.

FIG. 7 illustrates a reversal process that could be executed to reverse the upgrade process. The record log holding a record of all the changes made during the synchronization process could be processed to return both database systems to their pre-upgrade state.

Figure 8:
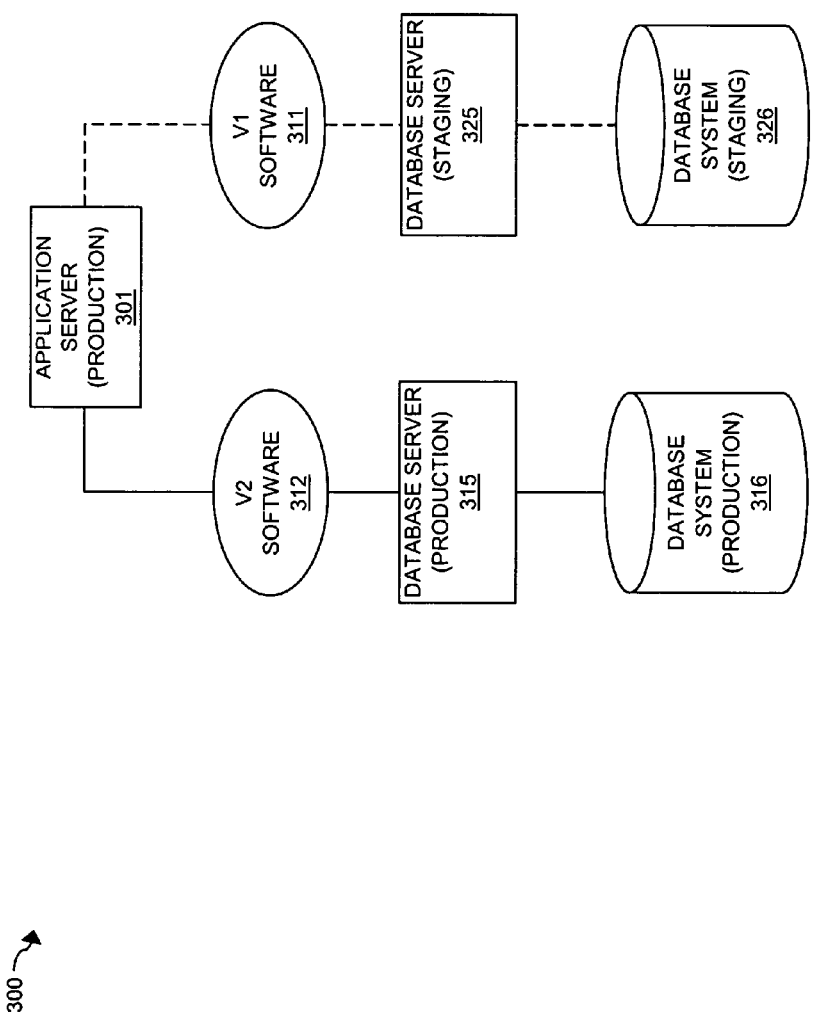
FIG. 8 illustrates an application system in an embodiment of the invention.
Figure 9:
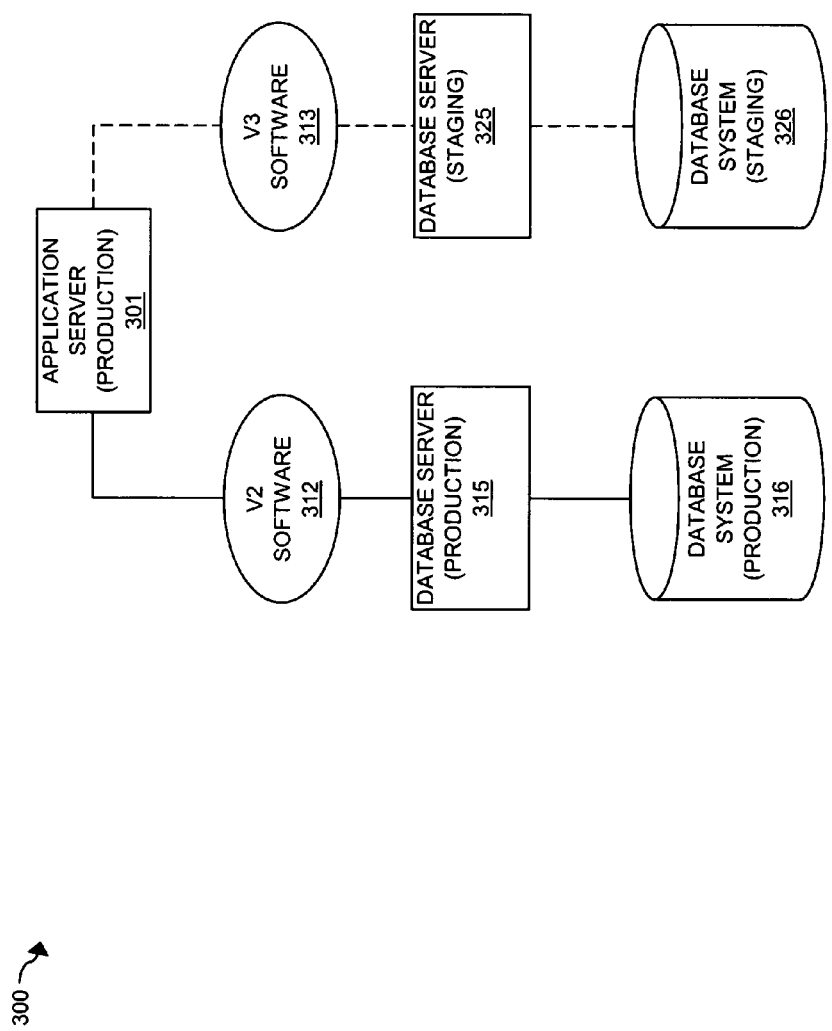
FIG. 9 illustrates an application system in an embodiment of the invention.

FIG. 8 illustrates the new configuration for production system 301 and staging system 302. Production system 301 now includes production application server 301, version two software 311, production database server 315, and production database system 316. Staging system 302 now includes production application server 301, version one software 312, staging database server 325, and staging database system 326. FIG. 9 illustrates an option whereby version one software 311 has been replaced by version three software 313. The upgrade process could be executed again to upgrade version two software 312 with version three software 313.

Advantageously, application system 300 provides for quickly and efficiently upgrading a production system with new software without having to take down the production system. Furthermore, application system 300 allows for testing the real-time performance of staging software prior to moving the software into a production environment. Such a system further provides for faster upgrading of operating systems, applications, and databases without impacting the availability of production services.

Figure 10:
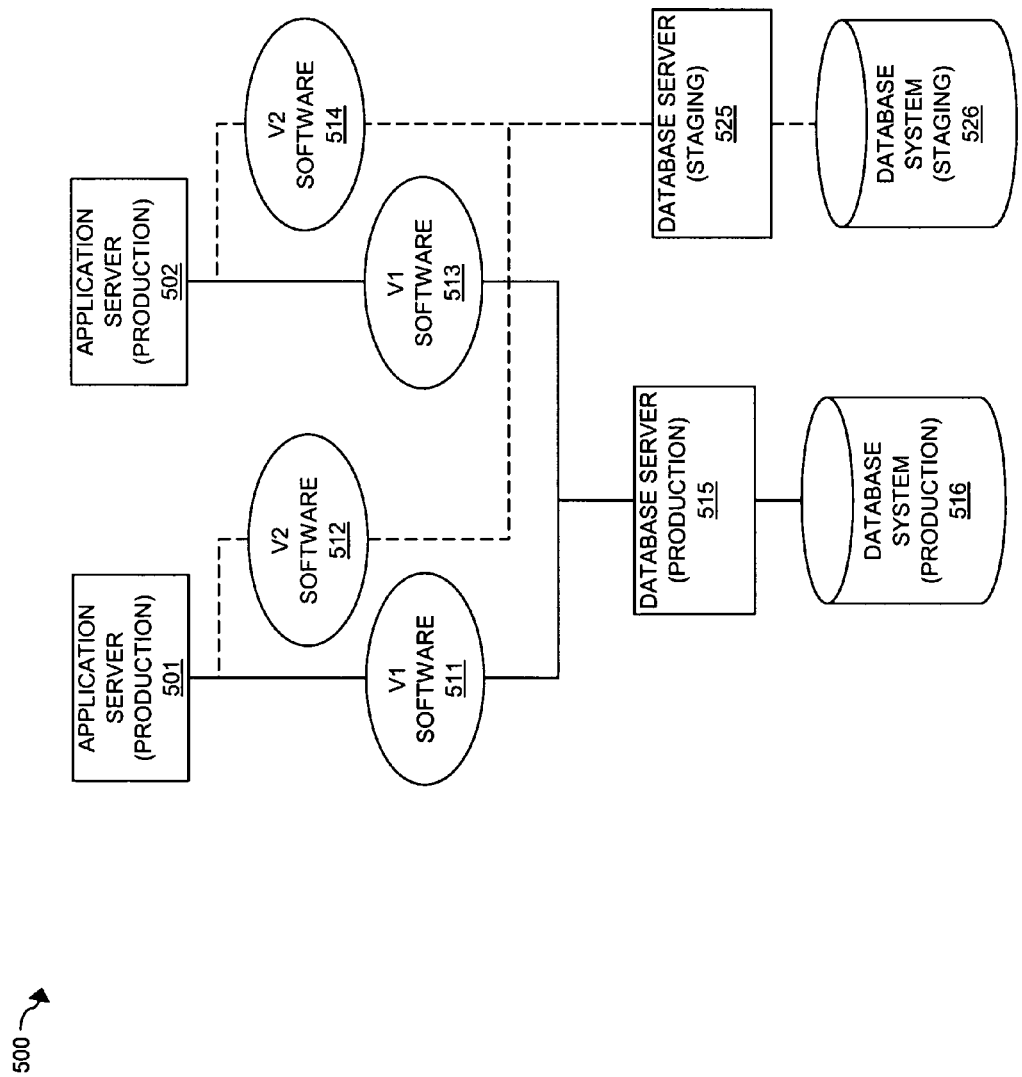
FIG. 10 illustrates an application system in an embodiment of the invention.
Figure 11:
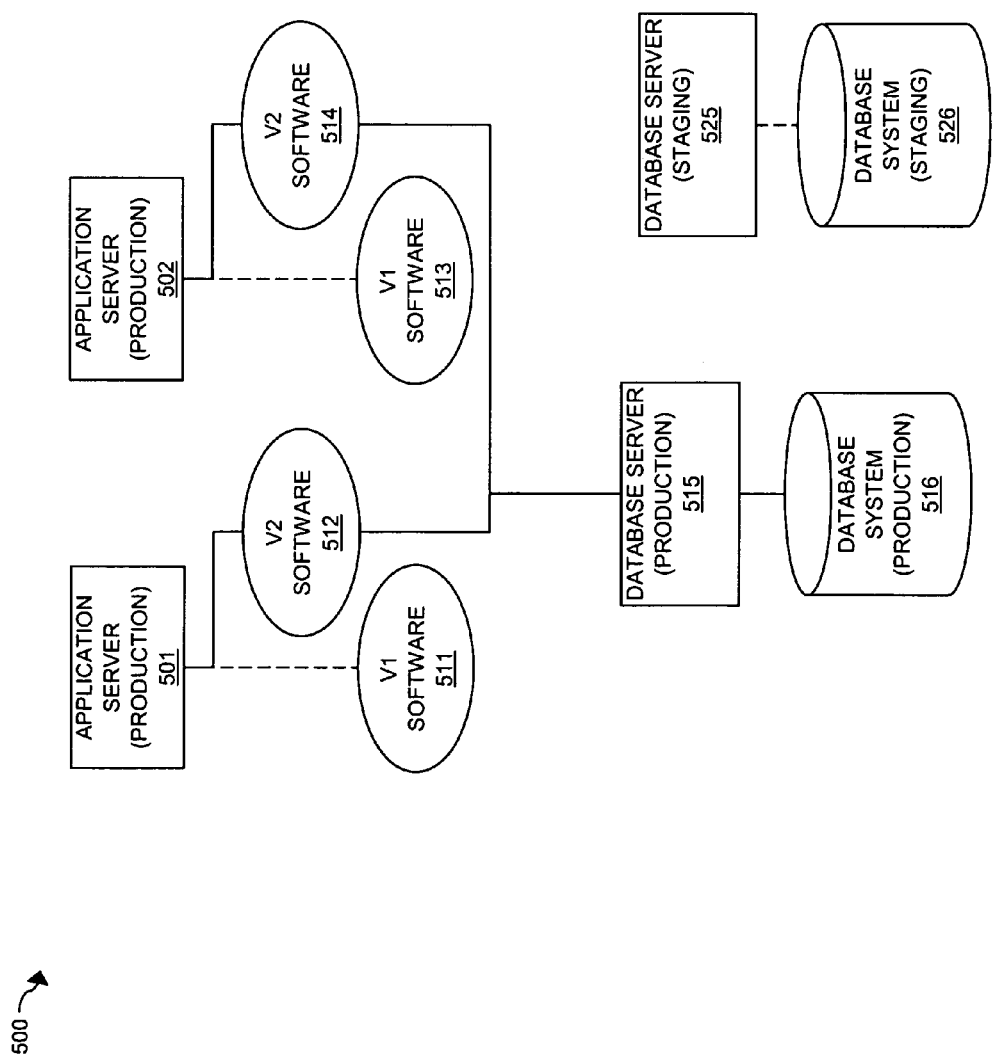
FIG. 11 illustrates an application system in an embodiment of the invention.

Second Embodiment Configuration and Operation—FIGS. 10 and 11

FIG. 10 illustrates application system 500 in an embodiment whereby multiple copies of application software are stored on and run on multiple application servers. Application system 500 includes production application server 501 and production application server 502. Production application servers 501 and 502 run multiple instances of a single application. Multiple instances of software make up the single application. A first instance of a first software version, version one software 511, runs on production application server 501. A second instance of the first software version, version one software 513 runs on production application server 502. A first instance of a second software version, version two software 512, runs on production application server 501. A second instance of a second software version, version two software 514, runs on production application server 502.

Production database server 515 interfaces with version one software 511 during the operations of the application on production application server 501. Production database server 515 interfaces with the software to store and retrieve application data to and from production database system 516. Production database server 515 also interfaces with version one software 513 during the operations of the application on production application server 502. Production database server 515 interfaces with the software to store and retrieve application data to and from production database system 516.

Staging database server 525 interfaces with version two software 512 during the operations of the application on production application server 501. Staging database server 525 interfaces with the software to store and retrieve application data to and from production database system 526. Staging database server 525 also interfaces with version two software 514 during the operations of the application on production application server 502. Staging database server 525 interfaces with the software to store and retrieve application data to and from production database system 526.

As illustrated by the dashed lines in FIG. 10, second version software 512 and 512 comprise the staging system, along with staging database server 525 and staging database system 526. Likewise, the solid lines indicate the production system, including version one software 511 and 513, and production database server 515 and production database system 516.

FIG. 11 illustrates the resulting topology of application system 500 after the first version software has been upgraded with the second version software. Namely, version two software 512 and 514 now comprise the production system, along with production database server 515 and production database system 516. Version one software 511 and 513 no longer interface to a database server or system.

Advantageously, application system 500 provides for running multiple copies of production software and staging software. All the multiple copies of production software can be seamlessly and quickly upgraded with the multiple copies of staging software. Such a system further provides for faster upgrading of operating systems, applications, and databases without impacting the availability of production services.

What is claimed is:

1. An application system comprising:
   an application server configured to run first version software for an application and second version software for the application;
   a staging database server configured to initially interface with the second version software to populate a staging database system with second data for the application generated by the second version software, wherein the second version software processes an application data stream to generate the second data;
   a production database server configured to initially interface with the first version software to populate a production database system with first data for the application generated by the first version software, wherein the first version software processes the application data stream to generate the first data, synchronize the first data with the second data to replicate the second data to the production database system, cease interfacing with the first version software and begin to interface with the second version software to populate the production database system with the second data generated by the second version software;
   the staging database server further configured to cease interfacing with the version two software and begin interfacing with the first version software to populate staging database system with the first data for the application generated by the first version software.

2. The application system of claim 1 wherein the production database server is further configured to record the changes made to the first data to synchronize the first data with the second data.

3. The application system of claim 1 wherein the production database server is further configured to reverse the changes made to the first data, cease interfacing with the second version software, and switch back to interfacing with the first version software.

4. The application system of claim 1 wherein the second version software is an upgrade of the first version software.

5. The application system of claim 1 wherein the production database server interfacing with the first version software comprises a live application system and wherein the staging database server interfacing with the second version software comprises a staging application system.

6. The application system of claim 5 wherein the live application system is live and the staging application system is not live.

7. The application system of claim 1 wherein the production database server interfacing with the second version software comprises a live application system.

8. A method of operating an application system, the method comprising:
   in an application server, running first version software for an application and second version software for the application;
   in a staging database server, initially interfacing with the second version software to populate a staging database system with second data for the application generated by the second version software, wherein the second version software processes an application data stream to generate the second data;
   in a production database server, initially interfacing with the first version software to populate a production database system with first data for the application generated by the first version software, wherein the first version software processes the application data stream to generate the first data;
   synchronizing the first data with the second data to replicate the second data to the production database system;
   ceasing interfacing with the first version software and beginning interfacing with the second version software to populate the production database system with the second data generated by the second version software;
   in the staging database server, ceasing interfacing with the version two software and beginning interfacing with the first version software to populate staging database system with the first data for the application generated by the first version software.

9. The method of claim 8 wherein the production database server interfacing with the second version software comprises a live application system.

10. The method of claim 9 further comprising recording the changes made to the first data to synchronize the first data with the second data.

11. The method of claim 9 further comprising, in the production database server, reversing the changes made to the first data, ceasing interfacing with the second version software, and switching back to interfacing with the first version software.

12. The method of claim 9 wherein the second version software is an upgrade of the first version software.

13. The method of claim 9 wherein the production database server interfaced with the first version software comprises a live application system and wherein the staging database server interfaced with the second version software comprises a staging application system.

14. The method of claim 13 wherein the live application system is live and the staging application system is not live.

* * * * *